United States Patent
Buehler et al.

(10) Patent No.: US 10,223,415 B2
(45) Date of Patent: *Mar. 5, 2019

(54) GENERATION OF MAPPING DEFINITIONS FOR CONTENT MANAGEMENT SYSTEM

(71) Applicant: International Business Machines Corporation, Armonk, NY (US)

(72) Inventors: Dieter Buehler, Tuebingen (DE); Matthias Falkenberg, Stuttgart (DE); Peter Fischer, Marktrodach (DE); Richard Jacob, Filderstadt (DE); Simon Kirchmann, Stuttgart (DE); Stephan Laertz, Herrenberg (DE); Juergen Schaeck, Boeblingen (DE); Andreas C. Seidel, Weil im Schoenbuch (DE); Thomas Steinheber, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 693 days.

This patent is subject to a terminal disclaimer.

(21) Appl. No.: 14/736,554

(22) Filed: Jun. 11, 2015

(65) Prior Publication Data

US 2016/0171120 A1 Jun. 16, 2016

Related U.S. Application Data

(63) Continuation of application No. 14/568,787, filed on Dec. 12, 2014, now Pat. No. 9,798,773.

(51) Int. Cl.
G06F 17/00 (2006.01)
G06F 17/30 (2006.01)

(52) U.S. Cl.
CPC .. *G06F 17/30442* (2013.01); *G06F 17/30864* (2013.01); *G06F 17/30873* (2013.01); *G06F 17/30917* (2013.01); *G06F 17/30923* (2013.01)

(58) Field of Classification Search
CPC ........ G06F 17/30442; G06F 17/30734; G06F 17/30864; G06F 17/30873; G06F 17/30917

See application file for complete search history.

(56) References Cited

U.S. PATENT DOCUMENTS

| 7,996,754 B2 | 8/2011 | Bodin et al. |
| 8,661,001 B2 | 2/2014 | Eliashberg et al. |

(Continued)

FOREIGN PATENT DOCUMENTS

| CN | 1588370 A | 3/2005 |
| CN | 101101603 A | 1/2008 |

(Continued)

OTHER PUBLICATIONS

Fromin, "Understanding IBM Lotus Web Content Management Software", IBM, Lotus Software, Collaborative Solutions, White Paper, Jun. 2008, 10 pages, <ftp://ftp.software.ibm.com/ftp/lotusweb/workplace/LOW10771-USEN-01.pdf>.

(Continued)

*Primary Examiner* — Truong V Vo
(74) *Attorney, Agent, or Firm* — Christopher K. McLane

(57) ABSTRACT

The method includes automatic creation of mapping definitions. The method further includes analyzing an external data structure, wherein the external data structure has one or more elements. The method further includes determining a path length and a number of occurrences for each element of a first set of elements of the one or more elements. The method further includes generating at least one query state- (Continued)

ment for the first set of elements. The method further includes generating mapping definitions based, at least in part on the at least one generated query statement and the path length of each element of the first set of elements.

8 Claims, 6 Drawing Sheets

(56) References Cited

U.S. PATENT DOCUMENTS

| | | |
|---|---|---|
| 2005/0267789 A1 | 12/2005 | Satyadas et al. |
| 2009/0106273 A1 | 4/2009 | Petri |
| 2010/0070847 A1 | 3/2010 | Hampton et al. |
| 2010/0095197 A1 | 4/2010 | Klevenz et al. |
| 2011/0314396 A1 | 12/2011 | Diab et al. |
| 2013/0117736 A1* | 5/2013 | De Smet .................. G06F 8/30 717/153 |
| 2013/0339352 A1* | 12/2013 | Jin .................... G06F 17/30958 707/736 |
| 2014/0075004 A1 | 3/2014 | Van Dusen et al. |
| 2014/0173488 A1 | 6/2014 | Munkes et al. |
| 2016/0171046 A1 | 6/2016 | Buehler et al. |

FOREIGN PATENT DOCUMENTS

| | | |
|---|---|---|
| CN | 101291304 A | 10/2008 |
| CN | 107077499 A | 8/2017 |
| WO | 2016092412 A1 | 6/2016 |

OTHER PUBLICATIONS

Mican et al., "Web Content Management Systems, a Collaborative Environment in the Information Society", Informatica Economica, vol. 13, No. v2/2009, pp. 20-31, <http://revistaie.ase.ro/content/50/003%20-%20mican.pdf>.

List of IBM Patents or Patent Applications Treated as Related, Filed Herewith.

Dieter Buehler, et al., "Generation of Mapping Definitions for Content Management System", U.S. Appl. No. 14/568,787, filed Dec. 12, 2014, (a copy is not provided as this application is available to the Examiner).

Patent Cooperation Treaty, PCT, International Search Report and the Written Opinion of the International Searching Authority, or the Declaration, International application No. PCT/IB2015/059204, Filed on Nov. 30, 2015, 7 pages.

Dieter et al., "Generation of Mapping Definitions for Content Management System", PCT Application No. IB2015/059204, Filed on Nov. 30, 2015, 27 pages.

* cited by examiner

```
<?xml version="1.0" encoding="UTF-8"?>
<?xml-stylesheet type="text/xsl"
Href="https://wpsvm249.boeblingen.de.ib.com:944/blogs/roller-ui/styles/atom.xsl" media="screen"?>

<feed xmlns="http://www.w3.org/2005/Atom"
    xmlns:app="http://www.w3.org/2007/app"
    xmlns:thr="http://purl.org/syndication/thread/1.0"
    xmlns:snx="http://www.ibm.com/xmlns/prod/sn"
    xmlns:opensearch="http://a9.com/-/spec/opensearch/1.1/"
    xml : lang="en-US">
  <id>urn:lsid:ibm.com:blogs:entries-c4fafd93-d452-4bea-91bc-e2c55a840091</id>
  <title type="text">Anna Blog</title>
  <subtitle type="html">This is a blog started by Anna</subtitle>
```
PORTION 304

```
  <entry xml:base="https://wpsvm249.boeblingen.de.ibm.com:944/blogs/anna/entry/copied_text" xml : lang="en-US" >
    <id>urn:lsid:ibm.com:blogs:entry-c1b56186-d74b-4363-89df-baf6b685el6f</id>
    <title type="text">copied text</title>
    <author>
      <name>Anna Bauer</name>
      <email>abauer@zetabank.com</email>
      <email>abauer2@zetabank.com</email>
      <snx:userid>982723b7-0356-43b0-abal-8510703c40fa</snx:userid>
      <snx:userState>active</snx:userState>
    </author>
    <published>2013-09-24T13:48:07+02:00</published>
    <updated>2013-09-24T13:48:07+2:00</updated>
    <content type="html">this is my simple content</content>
  </entry>
  <entry xml:base="https://wpsvm249.boeblingen.de.ibm.com:944/blogs/anna/entry/another_text" xml : lang="en-US" >
    <id>urn:lsid:ibm.com:blogs:entry-c1b56186-d74b-4363-89df-baf6b123e23f</id>
    <title type="text">copied text</title>
    <author>
      <name>Pauli Clemmons</name>
      <email>pclemmons@zetabank.com</email>
      <email>pclemmons@zetabank.com</email>
      <snx:userid>982723b7-0356-43b0-abal-8510123c12fa</snx:userid>
    </author>
    <published>2013-07-24T13:48:07+02:00</published>
    <updated>2013-07-24T13:48:07+2:00</updated>
    <content type="html">this is another simple content</content>
  </entry>
```
PORTION 302

```
</feed>
```
PORTION 304

FIG. 3

```
blog_posts.Name=ibm.portal.blog.posts
blog_posts.extends=ibm.portal.xml.atom
blog_posts.type=xpath
blog_posts.BeanListProviderID=ibm.portal.plr.xml
blog_posts.ResourceBundleBaseName=com.ibm.workplace.wcm.pzn.xml.AtomBeanListProvider blog_posts.NamespaceMapping.atom=http://www.w3.org/2005/Atom
blog_posts.NamespaceMapping.app=http://www.w3.org/2007/app
blog_posts.NamespaceMapping.snx+http://www.ibm.com/xmlns/prod/sn blog_posts.ListItemSelection=//atom:entry blog_posts.ItemAttribute.id=./atom:id
blog_posts.ItemAttribute.title=./atom:title
blog_posts.ItemAttribute.authorName=./atom:author/atom:name
blog_posts.ItemAttribute.authorEmail=./atom:author/atom:email
blog_posts.ItemAttribute.updated=./atom:updated
blog_posts.ItemAttribute.updated.Type=Date
blog_posts.ItemAttribute.published=.atom:published
blog_posts.ItemAttribute.published.type=Date
blog_posts.ItemAttribute.body=./atom:content blog_posts.ListProperty.id=/atom:feed/atom:id
blog_posts.ListProperty.title=/atom:feed/atom:title
blog_posts.ListProperty.summary=/atom:feed/atom:subtitle
```

GENERATION OF MAPPING DEFINITIONS FOR CONTENT MANAGEMENT SYSTEM

BACKGROUND OF THE INVENTION

The present invention relates generally to web portals, and more particularly to mapping a data structure for a web portal.

A web portal is most often a specially designed web page which brings information together from diverse sources in a uniform way. Usually, each information source gets a portlet, which is a dedicated area on the page for displaying information. Often, the user can configure which portlets to display. Variants of portals include mashups and intranet "dashboards" for executives and managers. The extent to which content is displayed in a uniform way may depend on the intended user and the intended purpose, as well as the diversity of the content. Very often, design emphasis is on a certain theme for configuring and customizing the presentation of the content and the chosen implementation framework and/or code libraries. In addition, the role of the user in an organization may determine which content can be added to the portal or deleted from the portal configuration.

A portal may use a search engine application programming interface (API) to permit users to search intranet content as opposed to extranet content by restricting which domains may be searched. Apart from this common search engine feature, web portals may offer other services such as e-mail, news, stock quotes, information from databases, and even entertainment content. Portals provide a way for enterprises and organizations to provide a consistent look and feel with access control and procedures for multiple applications and databases, which otherwise would have been different web entities at various uniform resource locators (URLs). The features available may be restricted by whether access is by an authorized and authenticated user (employee, member) or an anonymous site visitor.

SUMMARY

Embodiments of the present invention disclose a method, computer program product, and system for determining the similarity of topics. In one embodiment, in accordance with the present invention, the computer-implemented method includes automatic creation of mapping definitions. The method further includes analyzing an external data structure, wherein the external data structure has one or more elements. The method further includes determining a path length and a number of occurrences for each element of a first set of elements of the one or more elements. The method further includes generating at least one query statement for the first set of elements. The method further includes generating mapping definitions based, at least in part on the at least one generated query statement and the path length of each element of the first set of elements.

BRIEF DESCRIPTION OF THE DRAWINGS

FIG. 3 depicts an example of a data feed, in accordance with an embodiment of the present invention;

FIG. 4 depicts an example of a profile text, in accordance with an embodiment of the present invention;

DETAILED DESCRIPTION

Implementation of embodiments of the invention may take a variety of forms, and example implementation details are discussed subsequently with reference to the Figures.

Figure 1:
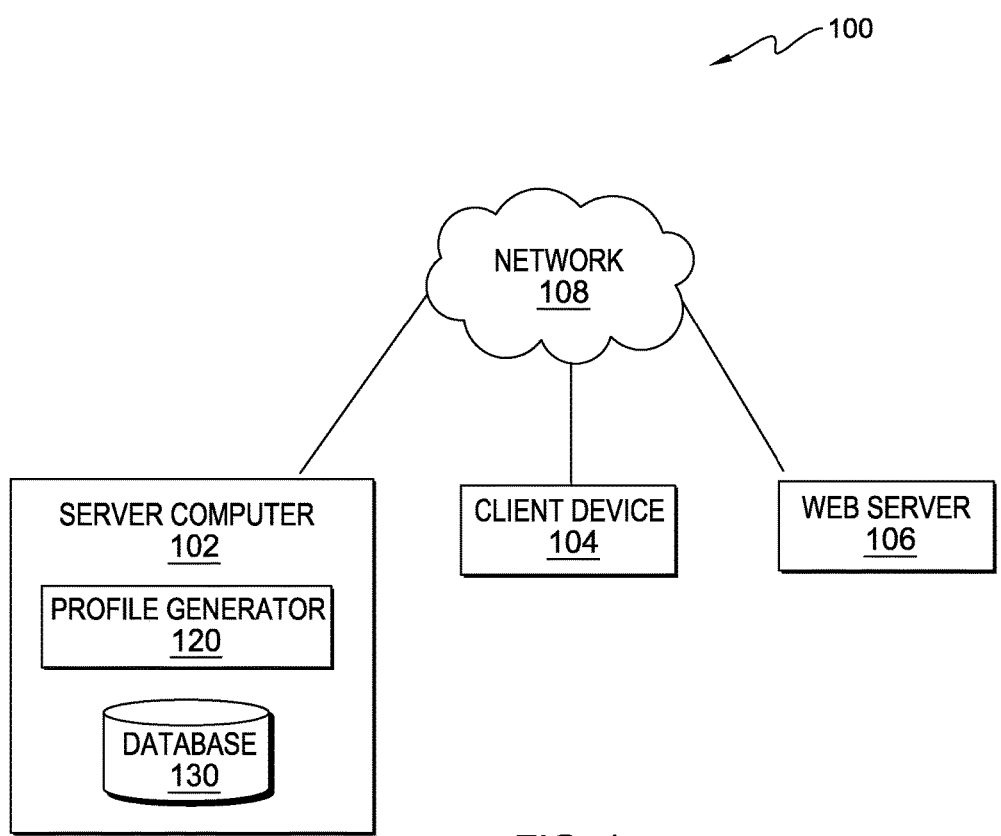
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 102, client device 104, and web server 106, all interconnected over network 108. Network 108 represents, for example, a telecommunications network, a local area network (LAN), a wide area network (WAN), such as the Internet, or a combination of the three, and includes wired, wireless, and/or fiber optic connections. Network 108 includes one or more wired and/or wireless networks that are capable of receiving and transmitting data, voice, and/or video signals, including multimedia signals that include voice, data, and video information.

In the depicted environment, server computer 102 is one or more of a management server, a web server, or any other electronic device or computing system capable of receiving and sending data. In the depicted embodiment, server computer 102 maps external data and creates a data structure, which can be used by web content management in a declarative manner. In one embodiment, server computer 102 represents a server computing system utilizing multiple computers as a server system, such as in a cloud computing environment. In another embodiment, server computer 102 represents a laptop computer, a tablet computer, a netbook computer, a personal computer (PC), a desktop computer, a personal digital assistant (PDA), a smart phone, or any programmable electronic device capable of communicating with client device 104 and web server 106 via network 108. In another embodiment, server computer 102 represents a computing system utilizing clustered computers and components to act as a single pool of seamless resources. Server computer 102 includes profile generator 120 and database 130.

In depicted distributed data processing environment 100, profile generator 120 resides on server computer 102. In one embodiment, profile generator 120 operates to create a profile for a feed, such as a uniform resource locator (URL), from various information sources. Profile generator 120 creates the profile based, at least in part, on the data format (e.g., extensible markup language (XML), JavaScript® object notation (JSON), concurrent versions system (CVS)) of the information source. The term "JavaScript" and the like may be subject to trademark rights in various jurisdictions throughout the world and are used here only in reference to the products or services properly denominated by the marks to the extent that such trademark rights may exist. For the sake of convenience, this application will use XLM when discussing a data format. In this embodiment, the profile includes a mapping that controls the presentation of content of the information source as content on a portal. In one embodiment, an "interactive" embodiment, profile generator 120, receives input from a user that identifies a feed element and a profile element. In this case, profile generator 120 associates the feed element with the profile element by generating a path statement for the profile element. In an example, profile generator 120 receives user input providing a link to a feed, such as a URL. Profile generator 120 may determine a data format of the feed, such as Atom. Profile generator 120 receives user input identifying a feed element, such as "blog", and providing a name for a profile element, such as "blog title". In response, profile generator 120 generates a path statement for the element from the implementation code, such as "/atom:feed/atom:title".

Figure 5:
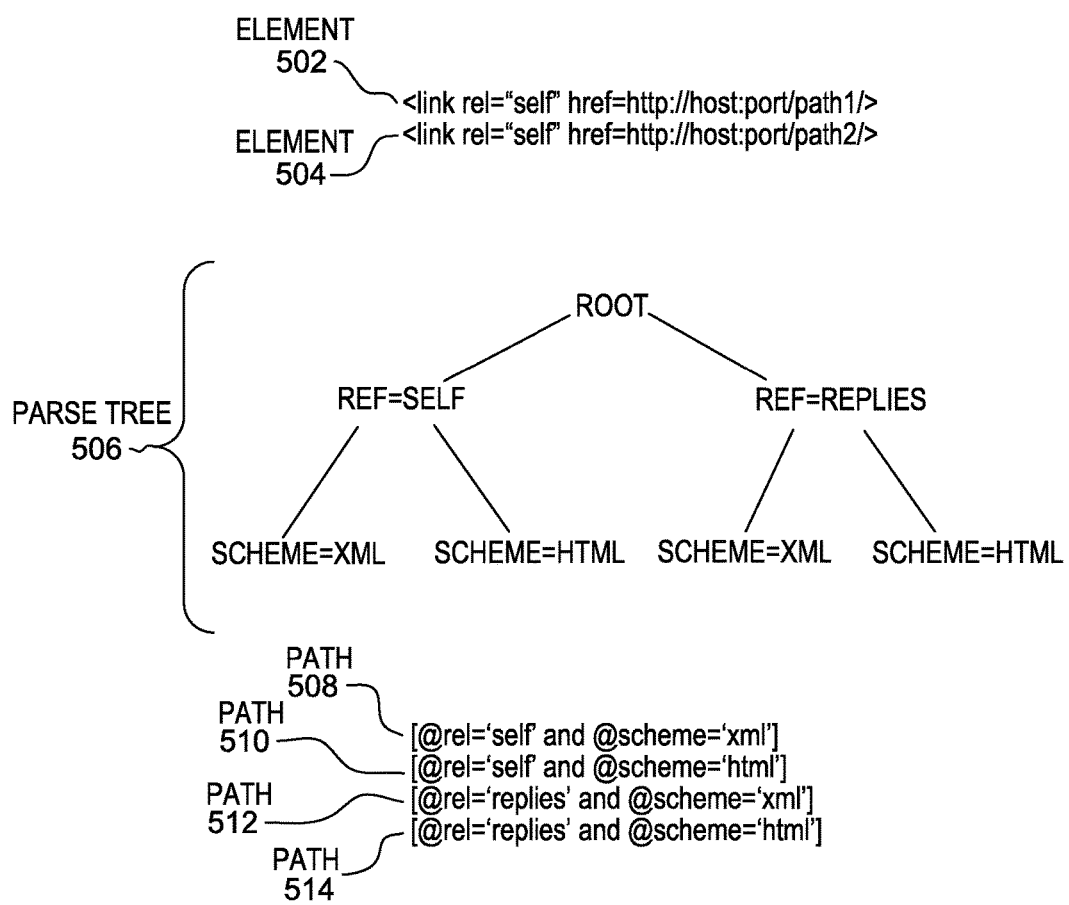
FIG. 5 depicts an example of a parse tree, in accordance with an embodiment of the present invention.

In another embodiment, an "automated" embodiment, profile generator 120 receives user input identifying a feed, based on which profile generator 120 generates an entire profile without user interaction. In this embodiment, profile generator 120 generates a profile by identifying data in the feed. In an example, a user provides a link to a feed. Profile generator 120 traverses the feed and automatically generates a profile with profile elements for all feed elements, including profile generator 120 generating profile element names based upon the names of the feed element. In one embodiment, a feed may be a link to a website. In another embodiment, a feed may be content that is delivered by the website, such as FIG. 5.

In yet another embodiment, a "merged" embodiment, profile generator 120 receives a user identified feed and one or more elements of the feed. In this embodiment, profile generator 120 generates a profile element for each feed element. Profile generator 120 identifies the feed elements. Then profile generator 120 generates a profile for the feed from the website. In an example, a user may select data entries and element names and compile them in a document, not in profile generator 120. In another embodiment a user may create the document in profile generator 120. This document may include the names to be used for corresponding element in the profile. Profile generator 120 may receive a feed from a user as well as the document containing select data entries and element names. Profile generator 120 may identify the provided data entries in the feed's content and generate the profile element for the provided data entries. In an example in which the elements names are provided, profile generator 120 would use the provided element names, but in an example in which no element name is provided, profile generator 120 may automatically generate an element name. Profile generator 120 is depicted and described in further detail with respect to FIG. 2.

In the depicted embodiment, database 130 resides on server computer 102. In another embodiment, database 130 may reside elsewhere in distributed data processing environment 100, such as independently as a standalone database that is capable of communicating with server computer 102 via network 108. Database 130 may also reside on a client computing device, such as client device 104. A database is an organized collection of data. Database 130 is implemented with any type of storage device capable of storing data that is accessed and utilized by server computer 102, such as a database server, a hard disk drive, or a flash memory. In other embodiments, database 130 represents multiple storage devices within server computer 102. Database 130 stores information such as, in various examples, data structures, generated profiles, user settings, element names, data entries, feeds, or documents containing information utilized by profile generator 120.

In the depicted embodiment, client device 104 is one or more of a desktop computer, a laptop computer, a tablet computer, a specialized computer server, a smart phone, or any programmable electronic device capable of communicating with server computer 102 via network 108 and with various components and devices within distributed data processing environment 100. In general, client device 104 represents any programmable electronic device or combination of programmable electronic devices capable of executing machine readable program instructions and communicating with other computing devices via a network, such as network 108. In an embodiment, client device 104 sends user identified information pertaining to a website, such as a link, content from the website, data entries, etc., to server computer 102 via network 108.

In the depicted environment, web server 106 is one or more of a management server, a web server, or any other electronic device or computing system capable of receiving and sending data. In the depicted embodiment, web server 106 hosts or creates websites that are accessible to client devices, such as client device 104, and servers, such as server computer 102. In one embodiment, web server 106 represents a server computing system utilizing multiple computers as a server system, such as in a cloud computing environment. In another embodiment, web server 106 represents a laptop computer, a tablet computer, a netbook computer, a personal computer (PC), a desktop computer, a personal digital assistant (PDA), a smart phone, or any programmable electronic device capable of communicating with client device 104 and server computer 102 via network 108. In another embodiment, web server 106 represents a computing system utilizing clustered computers and components to act as a single pool of seamless resources.

Figure 2:
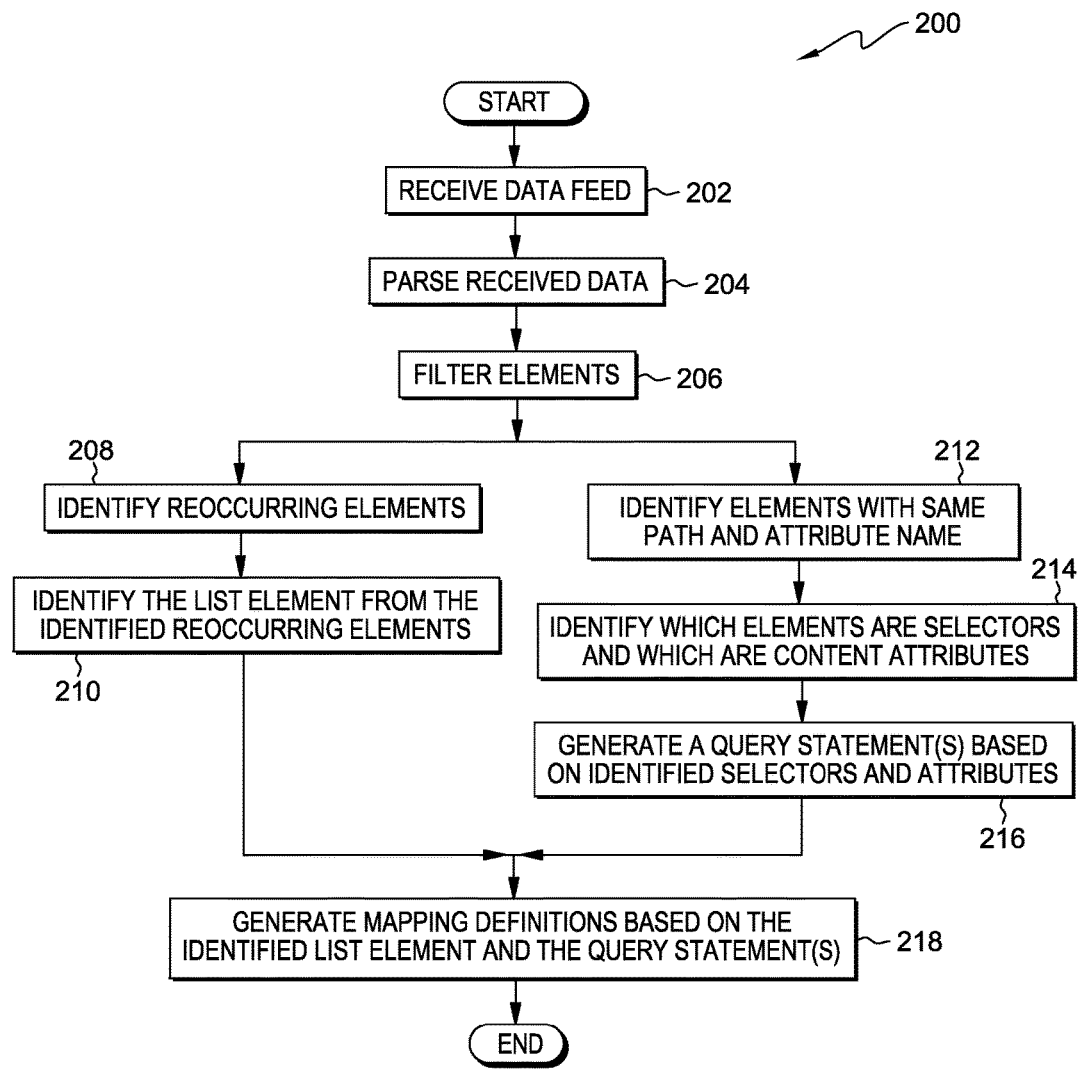
FIG. 2 is a flowchart depicting operational steps of a program for mapping external data and creating a data structure which can be used by web content management in a declarative manner within the distributed data processing environment of FIG. 1, in accordance with an embodiment of the present invention.

FIG. 2 is a flowchart depicting operational steps of profile generator 120, in accordance with an embodiment of the present invention. Profile generator 120 operates on server computer 102, maps external data, and creates a data structure which can be used by web content management in a declarative manner. In one embodiment, profile generator 120 receives a feed from a user of client device 104, wherein the feed is located on web server 106, which begins the operational steps of FIG. 2. The operational steps of FIG. 2 can occur in any order (e.g., receive data feed, parse received data, filter elements, identify elements with same path and attribute name, identify reoccurring elements, identify the list element from the identified reoccurring elements, identify which elements are selectors and which are content attributes, generate a query statement(s) based on identified selectors and attributes, generate mapping definitions based on the identified list element and the query statement(s), or the order of steps listed below).

Profile generator 120 receives a data feed (step 202). In one embodiment, profile generator 120 receives a data feed from client device 104. In an example, a user of client device 104 sends a feed from a website located on web server 106 to profile generator 120. In another example, a user of client device 104 may send a data feed of a web site located on web server 106 as well as a document previously created by the user of client device 104 with data entries and element names.

Profile generator 120 parses the received data (step 204). In one embodiment, profile generator 120 receives a feed for a website on web server 106 from a user of client device 104. In an example, profile generator 120 receives data referenced by the feed and then parses the data into at least one implementation-specific object (e.g., a document object model (DOM) tree). In an example of the interactive embodiment, the user of client device 104 provided the feed data in step 202; and therefore, no parsing is needed to differentiate boilerplate code. Profile generator 120 parses the received data by utilizing a parse tree such as FIG. 5, an abstract syntax tree, or any other method known by a person skilled in the art.

Profile generator 120 filters the elements (step 206). In one embodiment, profile generator 120 removes specific parsed elements that only identify the code language, language used for web content management (WCM), etc. and are not needed for generating mapping definition for a profile. In an example of the "interactive" embodiment, profile generator 120 displays the data elements identified by parsing (see step 204) to enable a user of client device 104 to select the entries to be used during the path generation. In this example, elements not selected by the user of client device 104 are filtered. In another example of the "interactive" embodiment, a user of client device 104 may add the name to be used in the profile for each data entry. In an example of the "automated" embodiment, all elements may be used for the path generation, such as portion 302 in FIG. 3. In an example of the "merged" embodiment, profile generator 120 may find elements in the feed that contain data that is part of the data elements list created by a user (e.g., the document) of client device 104, and profile generator 120 utilizes only the found entries in the path generator. In this example, if names for the elements have been provided by a user of client device 104, the names will be added to the list of data entries. In one embodiment, the filtered code is deleted, thereby modifying a local copy of the feed data. In another embodiment, the filtered code is disregarded. In an embodiment, steps 208 and 210 are done concurrently with steps 212, 214, and 216. In another embodiment, the steps may take place in numerical order.

Profile generator 120 identifies reoccurring elements (step 208). In an embodiment, profile generator 120 identifies reoccurring elements from the list of parsed and filtered elements. In an example, profile generator 120 identifies an element and assigns a value of one for the element. In this example, profile generator 120 continues to review the elements from the list of parsed and filtered element and if another occurrence of the identified element is located, then the assigned value for the element is increased by a value of one. Profile generator 120 identifies elements and assigns values for the list of parsed and filtered elements. In an example, portion 302 each have a name occurring once in the feed and an email occurring twice in each feed. In one embodiment, a feed may have a small amount of data and a reoccurring element may only occur once. In an example, in portion 302 of FIG. 3, the element email has reoccurred two times, whereas the other elements have occurred once.

Profile generator 120 identifies the list element from the identified reoccurring elements (step 210). In an embodiment, profile generator 120 searches the list of the identified reoccurring elements from step 208 for the element with the shortest path length, which is identified as the list element. In one example, profile generator 120 identifies five elements, each having the same path length, which happens to be the shortest path length. In this example, profile generator 120 then identifies which of the five elements has the greatest number of occurrences, and the element with the shortest path length and greatest number of occurrences is identified as the list element. In an example, in portion 302 email reoccurs four times; however, entry occurs only twice and it has the shortest path. In this example, entry is the list element.

Profile generator 120 identifies elements with the same path and attribute name (step 212). In one embodiment, profile generator 120 identifies elements with the same path and attribute name from among the filtered elements in step 206. In an example, profile generator 120 identifies all elements with the same path and the same attribute names. In an example of elements 502 and 504 in FIG. 5, profile generator 120 may identify a first element, <link rel="self" href=http://host:port/path1/>, and a second element, <link rel="self" href=http://host:port/path2/>, as having the same path ("/link") and the same attribute names ("rel" and "href").

Profile generator 120 identifies which elements are selectors and which are content attributes (step 214). In one embodiment, profile generator 120 identifies if the values of the attributes repeat for the elements with the same attribute names as identified in step 212. For example, in elements 502 and 504 of FIG. 5, the value for the attribute named "rel" is "self" and is repeated, but the value for the attribute named "href" is not, as it is "http://host:port/path1" in one occurrence and "http://host:port/path2" in another. In an example, profile generator 120 marks the attribute as a content attribute if the attribute value does not repeat and as a selector if the attribute value does repeat. In one embodiment, profile generator 120 further identifies if a repeating value exceeds a threshold value which comprises the number of repeating occurrences divided by the number of all values of the attribute. For example, if a threshold value is set at ½ and if "rel='self'" occurs five times in seven links, then "rel='self'" would exceed the threshold. Profile generator 120 may repeat this step to determine if a value of an attribute is content (e.g., the value occurs seldom or under that threshold) or if the value is a selector (i.e., the value occurs often or is equal to or greater than the threshold).

In an embodiment, profile generator 120 generates a tree of attribute/value sets that represents the combinations of selectors for the elements that are identified. In one example, profile generator 120 identifies values "self" and "replies" for attribute "ref". Profile generator 120 also identifies values "xml" and "html" for attribute "scheme". In this example, each of "ref" and "scheme" is an attribute of the same element, which is represented in this example as the "root" node. An example tree may look like parse tree 506 in FIG. 5. Profile generator 120 will traverse parse tree 506 and store the paths to all leaves in a combinations list, such as path 508 [@rel='self' and @scheme='xml'], path 510 [@rel='self' and @scheme='html'], path 512 [@rel='replies' and @scheme='xml'], and path 514 [@rel='replies' and @scheme='html'].

Profile generator 120 generates a query statement(s) based on identified selectors and attributes (step 216). In one embodiment, profile generator 120 generates a query statement by analyzing the data entries with regard to the location of the data entries in the feed's document. Based upon the path, selectors (attribute name/value pair), and content attributes, profile generator 120 generates the corresponding query statement. For example, profile generator 120 uses an element with the path "/feed/entry/link", selector "rel='self'", and content attribute "href". The generated query statement would read "/feed/entry/link[@rel='self']/@href". In another embodiment, there is no differentiation between selectors and content attributes, and query statement(s) are generated utilizing elements with a path and related attributes.

Profile generator 120 generates mapping definitions based on the identified list element and the query statement(s) (step 218). In one embodiment, profile generator 120 generates a new profile containing basic information like the profile name, namespaces used in the document, etc. For example, the basic information can be provided by a user of a client device or preset on profile generator 120. Profile generator 120 adds the elements consisting of an element name (list element) and a path statement (query statement). If the element name was not provided, then profile generator 120 generates a name based on the path of the entry in the feed. In an example, profile generator 120 generates the list item selection entry based on the list element. For example, profile generator 120 generates the list item selection, item attributes, and list properties in FIG. 4 from portions 302 and 304 in FIG. 3. Profile generator 120 checks if the path starts with the path of the list element. In one variation of the example, the path starts with the list element, and profile generator 120 uses the item attribute for that query statement. In another variation of the example, the path does not start with the list element, and profile generator 120 uses the list property for the query statement. For example, if path starts with "subtitle" as in portion 304 of FIG. 3, profile generator generates a list property, such as the last line of FIG. 4. If the path starts with "entry" as in portion 302 of FIG. 3, profile generator 120 generates an item attribute as depicted in FIG. 4.

Figure 6:
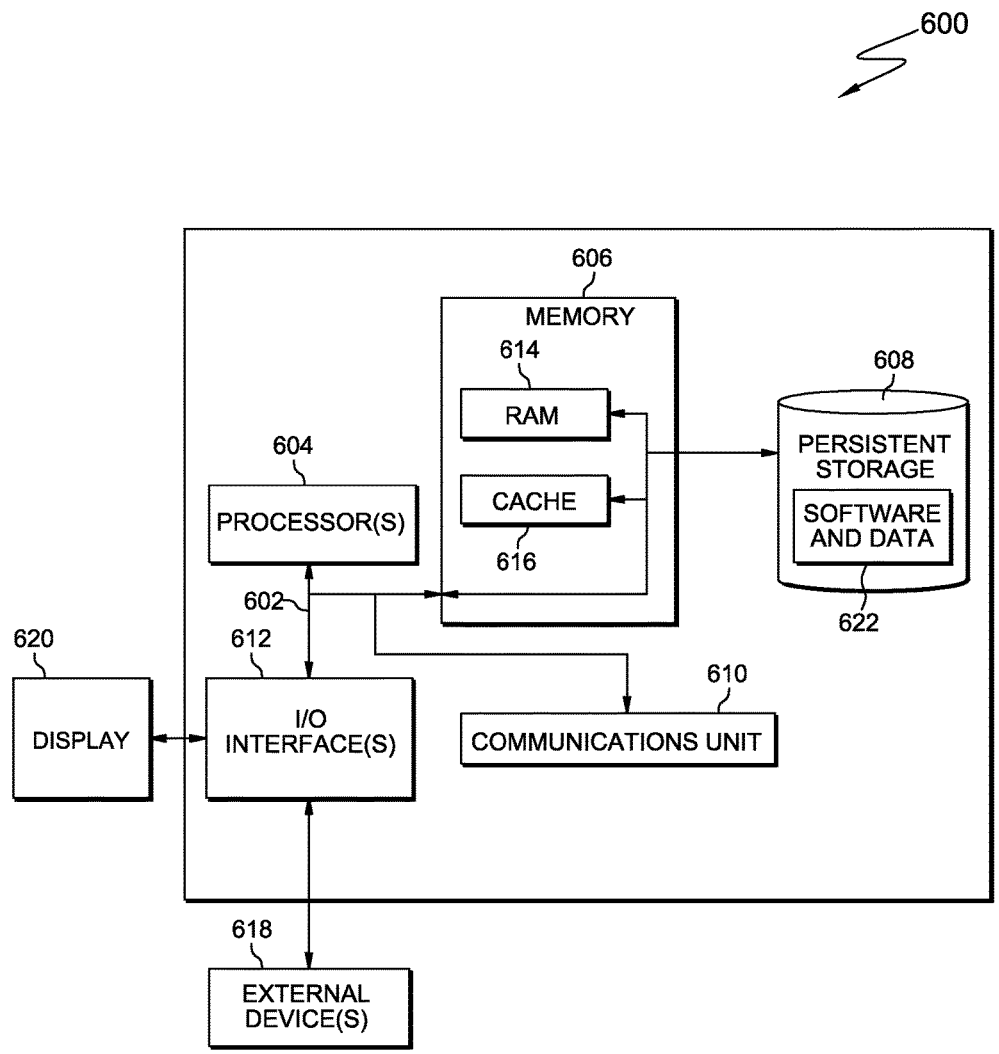
FIG. 6 depicts a block diagram of components of a server computer, an intelligence source server, a web server, and client devices of FIG. 1, in accordance with an embodiment of the present invention.

FIG. 6 depicts a block diagram of components of computer 600, which is representative of server computer 102, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computer 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications, and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media. Software and data 622 are stored in persistent storage 608 for access and/or execution by processor(s) 604 via one or more memories of memory 606. With respect to server computer 102, software and data 622 represents profile generator 120 and database 130.

In this embodiment, persistent storage 608 includes a magnetic hard disk drive. Alternatively, or in addition to a magnetic hard disk drive, persistent storage 608 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Software and data 622 may be downloaded to persistent storage 608 through communications unit 310.

I/O interface(s) 612 allows for input and output of data with other devices that may be connected to computer 600. For example, I/O interface(s) 612 may provide a connection to external device(s) 618 such as a keyboard, a keypad, a touch screen, and/or some other suitable input device. External device(s) 618 can also include portable computer readable storage media such as, for example, thumb drives, portable optical or magnetic disks, and memory cards. Software and data 622 can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for the automatic creation of mapping definitions, the method comprising:
    analyzing, by one or more computer processors, an external data structure, wherein the external data structure has one or more elements;
    determining, by one or more computer processors, a path length and a number of occurrences for each element of a first set of elements of the one or more elements;
    generating, by one or more computer processors, at least one query statement for the first set of elements; and
    generating, by one or more computer processors, mapping definitions based, at least in part, on the at least one generated query statement and the path length of each element of the first set of elements.

2. The method of claim 1, wherein the mapping definition controls the presentation of content of an information source in a content management system.

3. The method of claim 1, wherein generating mapping definitions further comprises:
    determining, by one or more computer processors, a shortest path length based, at least in part, on the path length of each element of the first set of elements; and
    generating, by one or more computer processors, mapping definitions based on the at least one generated query statement and the shortest path length.

4. The method of claim 3, wherein identifying the shortest path length comprises:
  determining, by one or more computer processors, that a first element of the first set of elements has the same path length as a second element of the first set of elements; and
  determining, by one or more computer processors, that the first element has a greater number of occurrences than the second element and, in response, determining the shortest path length to be the path length of the first element.

5. The method of claim 1, wherein generating the at least one query statement comprises:
  identifying, by one or more computer processors, a first element of the one or more elements having a path that is the same as a path of a second element of the one or more elements; and
  generating, by one or more computer processors, the at least one query statement based on the identified first element and second element.

6. The method of claim 1, further comprising:
  receiving, by one or more computer processors, input identifying a second set of elements of the one or more elements of the external data structure, where the second set of elements is mutually exclusive of the first set of elements.

7. The method of claim 6, wherein generating mapping definitions comprises:
  receiving, by one or more computer processors, a name for an element of the second set of elements; and
  generating, by one or more computer processors, a mapping definition for the element of the second set of elements based, at least in part, on the received name.

8. A method for the automatic creation of mapping definitions, the method comprising:
  analyzing, by one or more computer processors, an external data structure, wherein the external data structure has one or more elements;
  identifying, by one or more computer processors, an element from the one or more elements that has a path with a shortest path length, wherein the path identifies a location of the element within the external data structure;
  generating, by one or more computer processors, a query statement for at least one element of the one or more elements based on a path common to the at least one element; and
  generating, by one or more computer processors, mapping definitions based on the at least one generated query statement and the identified element with the shortest path length of the one or more elements.

* * * * *